United States Patent
Fu et al.

(10) Patent No.: US 12,248,173 B2
(45) Date of Patent: Mar. 11, 2025

(54) OPTICAL MODULE

(71) Applicant: Dongguan Luxshare Technologies Co., Ltd, Dongguan (CN)

(72) Inventors: Chung-Hsin Fu, Taipei (TW); Min-Sheng Kao, Taipei (TW); ChunFu Wu, Dongguan (CN); Yi-Tseng Lin, Taipei (TW); Chih-Wei Yu, Taipei (TW); Chien-Tzu Wu, Taipei (TW); QianBing Yan, Dongguan (CN); Yueh-Kuo Lin, Taipei (TW)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 321 days.

(21) Appl. No.: 18/087,492

(22) Filed: Dec. 22, 2022

(65) Prior Publication Data
US 2023/0333317 A1   Oct. 19, 2023

(30) Foreign Application Priority Data

Apr. 18, 2022  (CN) .......................... 202210401987.2

(51) Int. Cl.
  *G02B 6/12*       (2006.01)
  *H01S 3/00*       (2006.01)
  (Continued)

(52) U.S. Cl.
  CPC ........ *G02B 6/12004* (2013.01); *H01S 3/0071* (2013.01); *H01S 3/025* (2013.01);
  (Continued)

(58) Field of Classification Search
  CPC ...... G02B 6/12004; G02B 2006/12102; G02B 2006/12104; G02B 2006/12121;
  (Continued)

(56) References Cited

U.S. PATENT DOCUMENTS 9,632,260 B2 *  4/2017  Mizobuchi ............. G02B 6/428
2017/0031117 A1  2/2017  Nagarajan et al.
(Continued)

FOREIGN PATENT DOCUMENTS

CN        101013188 A     8/2007
CN        106019496 A    10/2016
(Continued)

*Primary Examiner* — John Bedtelyon
(74) *Attorney, Agent, or Firm* — Birch, Stewart, Kolasch & Birch, LLP

(57) ABSTRACT

Disclosed is an optical module, including a lower housing, an upper housing covering the lower housing, a circuit board, a first metal base, a second metal base, a silicon photonic chip, and a light emission module including a laser chip and an optical path assembly. The first metal base is disposed on one side of the upper housing. The second metal base is disposed on one side of the lower housing. The circuit board with a hollow region is disposed on the second metal base. The silicon photonic chip is disposed on the second metal base exposed from the hollow region. The laser chip is disposed on the first metal base. The optical path assembly is disposed on the first metal base and/or on the second metal base exposed from the hollow region, and guides a third optical signal emitted by the laser chip to the silicon photonic chip.

10 Claims, 14 Drawing Sheets

(51) Int. Cl.
*H01S 3/02* (2006.01)
*H01S 3/04* (2006.01)

(52) U.S. Cl.
CPC .. *H01S 3/0405* (2013.01); *G02B 2006/12102* (2013.01); *G02B 2006/12104* (2013.01); *G02B 2006/12121* (2013.01); *G02B 2006/1213* (2013.01)

(58) Field of Classification Search
CPC ............ G02B 2006/1213; G02B 6/428; G02B 6/4244; G02B 6/4214; G02B 6/4245; G02B 6/4268; H01S 3/0071; H01S 3/025; H01S 3/0405
See application file for complete search history.

(56) References Cited

U.S. PATENT DOCUMENTS

| | | | |
|---|---|---|---|
| 2018/0298628 | A1 | 10/2018 | Nagarajan et al. |
| 2018/0337111 | A1 | 11/2018 | Jou et al. |

FOREIGN PATENT DOCUMENTS

| | | | |
|---|---|---|---|
| CN | 107436466 | A | 12/2017 |
| CN | 108548102 | A | 9/2018 |
| CN | 109725392 | A | 5/2019 |
| CN | 1878035 | B | 4/2020 |
| CN | 210401756 | U | 4/2020 |
| CN | 111338039 | A | 6/2020 |
| CN | 111352192 | A | 6/2020 |
| CN | 111474644 | A | 7/2020 |
| CN | 215575818 | U | 1/2022 |
| JP | 4031384 | B2 | 1/2008 |
| TW | 201604604 | A | 2/2016 |
| WO | WO 2021/248955 | A1 | 12/2021 |

\* cited by examiner

OPTICAL MODULE

CROSS REFERENCE TO RELATED APPLICATION

This application claims the priority benefit of Chinese Patent Application Serial Number 202210401987.2, filed on Apr. 18, 2022, the full disclosure of which is incorporated herein by reference.

BACKGROUND

Technical Field

The present disclosure relates to the field of optical communication, and in particular, to an optical module.

Related Art

In modern communication systems, the demand for network traffic grows very rapidly. Therefore, fiber broadband has gradually become the mainstream to make optical modules very important. During the signal transmission process of the optical module, the electronic chip is responsible for transmitting an electrical signal from the system device to the light-emitting chip, so that the light-emitting chip is responsible for converting the electrical signal into an optical signal, and then transmits the optical signal through the optical fiber. In the process of receiving the signal by the optical module, the light-receiving chip is responsible for converting the optical signal received through the optical fiber into the electrical signal and transmitting the electrical signal to the electronic chip, so that the electronic chip is responsible for transmitting the received electrical signal to the system device.

With the increase of data transmission density, the optical module with a single channel is not enough at present. Therefore, the relevant industry proposes to obtain a higher-speed optical module by increasing the number of light-receiving chips, light-emitting chips and optical fibers (i.e., the optical module with multiple channels). Based on the space design and the heat dissipation of the light-emitting chip, the optical module usually adopts an architecture, which integrates a silicon photonic chip that integrates a light-receiving chip and an optical modulator with an externally configured light-emitting chip, to realize the processing of optical signals. However, under the architecture, in order to reduce the loss of electrical signal transmission between the silicon photonic chip and the electronic chip, it is necessary that the silicon photonic chip and the electronic chip are disposed on the same plane, so that the light-emitting chip and the light guide assembly should be disposed on the same plane as the silicon photonic chip, which leads to the following two problems:

(1) The heat energy of the light-emitting chip, the light guide assembly and the silicon photonic chip can only be dissipated from the lower housing of the optical module, so that there is a problem of poor heat dissipation because the heat dissipation through the lower housing is not the best heat dissipation path; and (2) In order to make the light-emitting chip, the light guide assembly and the silicon photonic chip disposed on the metal base exposed from the circuit board, to make the light-emitting chip, the light guide assembly, the silicon photonic chip and the electronic chip disposed on the same plane, the circuit board needs to remove a lot of area, so that there is a problem of reducing structural strength.

SUMMARY

The present disclosure provides an optical module, which can solve the problems of poor heat dissipation and reducing structural strength of the circuit board in the optical module in the prior art because the light-emitting chip, the light guide assembly, the silicon photonic chip and the electronic chip need to be disposed on the same plane.

In order to solve the above technical problem, the present disclosure is implemented as follows.

The present disclosure provides an optical module, comprising: a lower housing, an upper housing, a circuit board, a first metal base, a second metal base, a silicon photonic chip, and a light emission module including a laser chip and an optical path assembly. The upper housing covers the lower housing; the first metal base is disposed on a side of the upper housing facing the lower housing; and the second metal base is disposed on a side of the lower housing facing the upper housing. The circuit board is disposed on the second metal base and provided with a hollow region, so that part of the second metal base is exposed from the hollow region. The silicon photonic chip is disposed on the second metal base exposed from the hollow region and is electrically connected to the circuit board, and the silicon photonic chip is configured to output a first optical signal or receive a second optical signal. The laser chip is disposed on the first metal base to emit a third optical signal. The optical path assembly is disposed on the first metal base and/or the second metal base exposed from the hollow region, and is configured to guide the third optical signal emitted by the laser chip to the silicon photonic chip.

In the embodiments of the present disclosure, by the design of the optical path for transmitting the third optical signal emitted by the laser chip to the silicon photonic chip, the laser chip can be disposed on the first metal base, the optical path assembly can be disposed on the first metal base and/or the second metal base exposed from the hollow region, and the silicon photonic chip can be disposed on the second metal base exposed from the hollow region, so that the heat energy of the laser chip and part of the optical path assembly can be dissipated through the first metal base from the upper housing that belongs to the optimal heat dissipation path, and the heat energy of another part of the optical path assembly and the silicon photonic chip can be dissipated from the lower housing through the second metal base, which solves the problem of poor heat dissipation in the prior art. In addition, only part of the optical path assembly and the silicon photonic chip are disposed on the second metal base exposed from the hollow region, so that the circuit board can reduce the area of the hollow region and maintain the structural strength.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Figure 1:
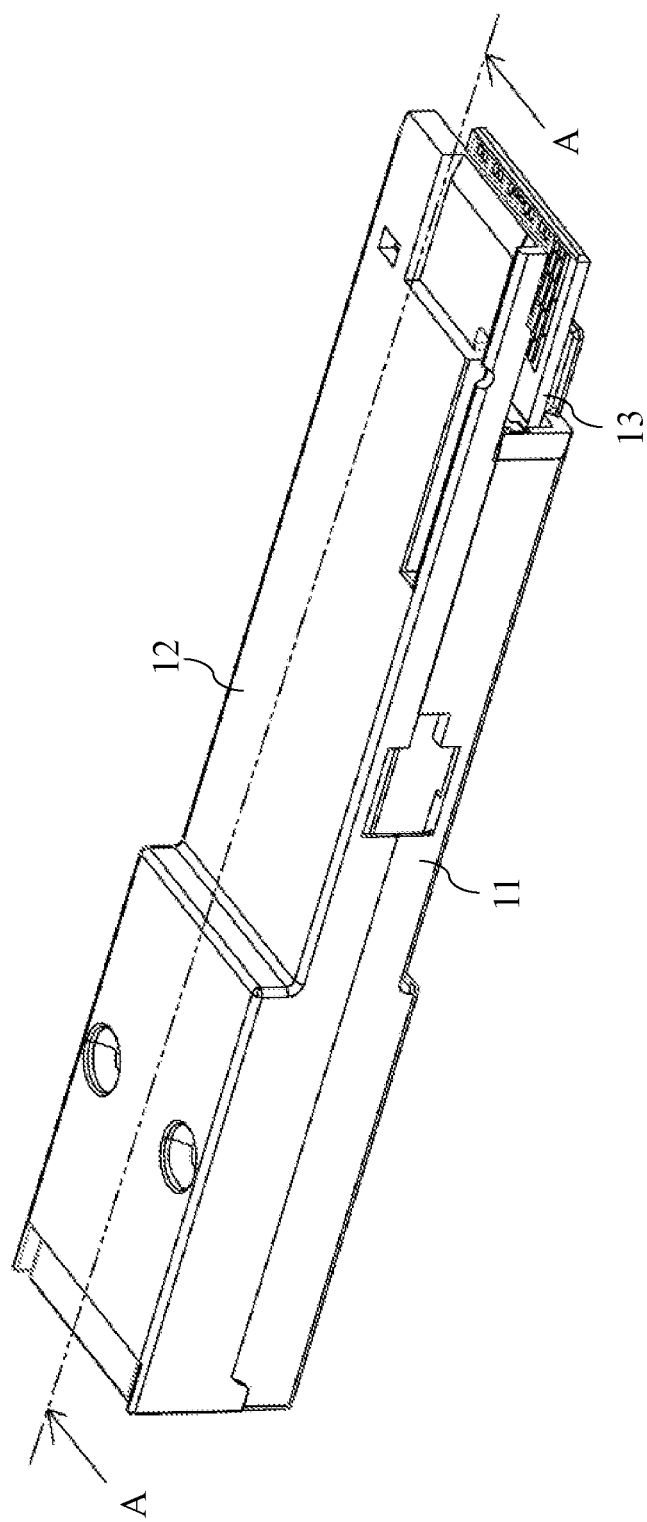
FIG. 1 is a combination diagram of an optical module according to a first embodiment of the present disclosure.
Figure 2:
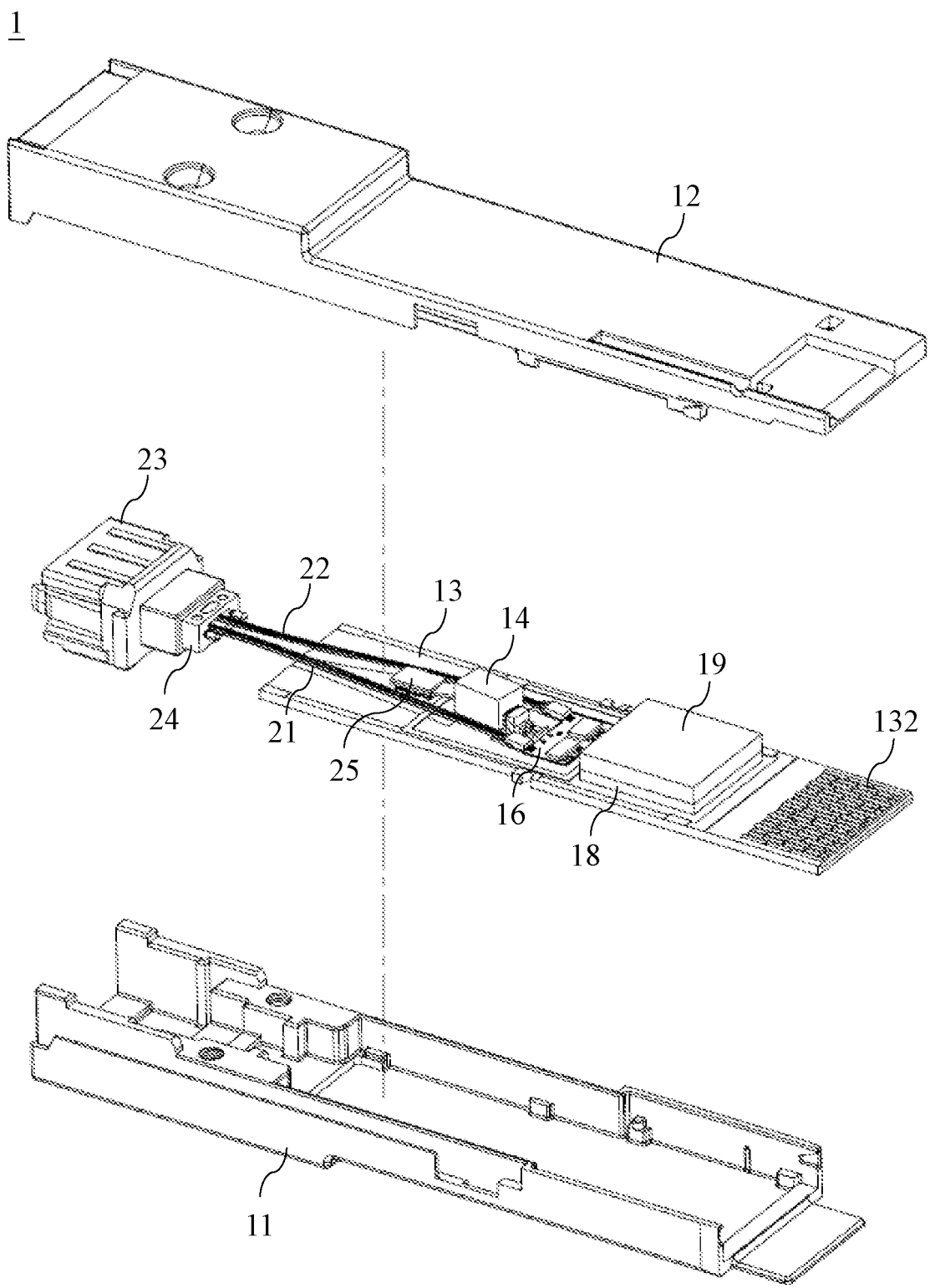
FIG. 2 is an exploded view of an embodiment of the optical module of FIG. 1.
Figure 3:
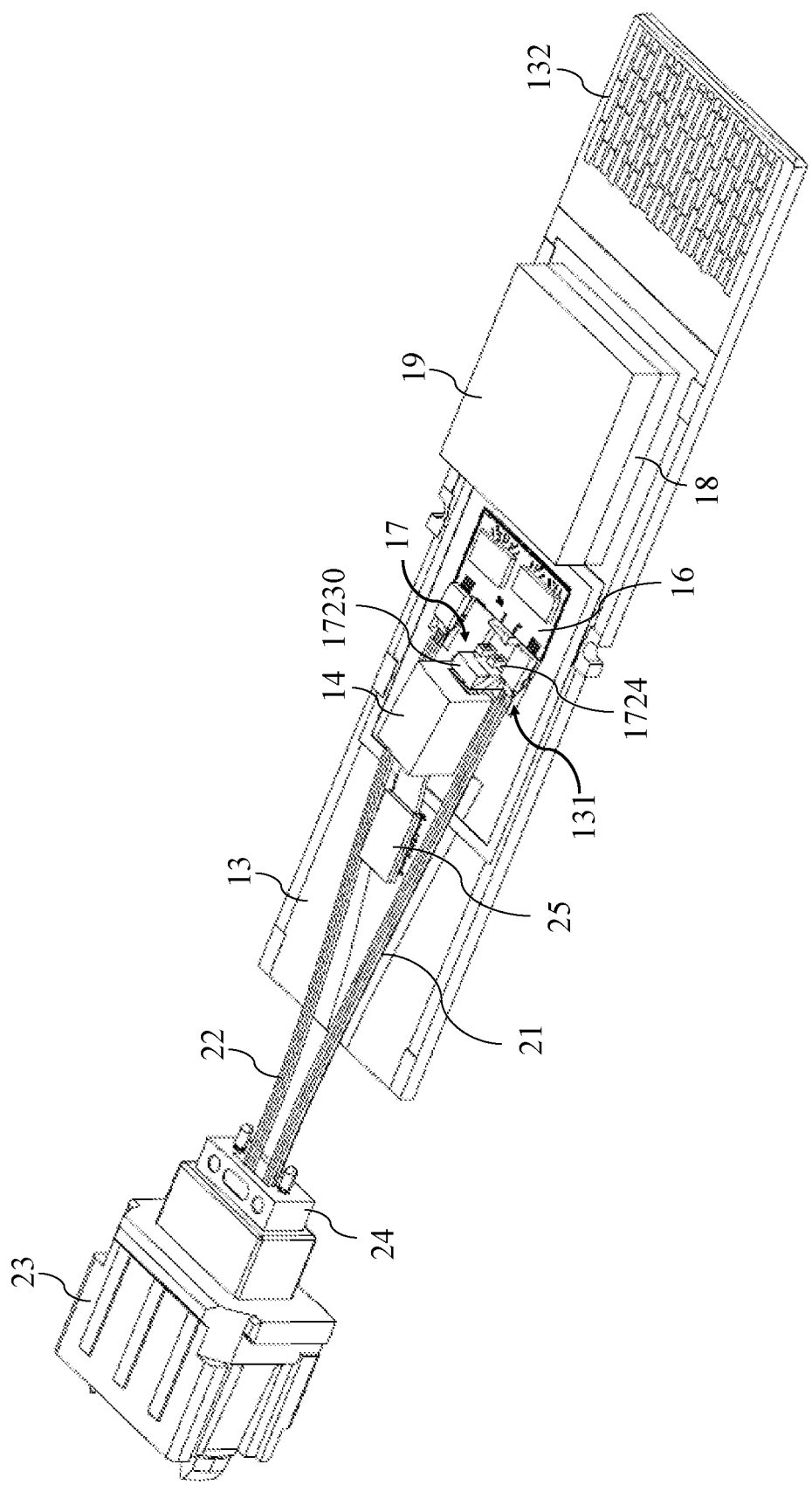
FIG. 3 is a partial perspective view of the optical module of FIG. 2.
Figure 4:
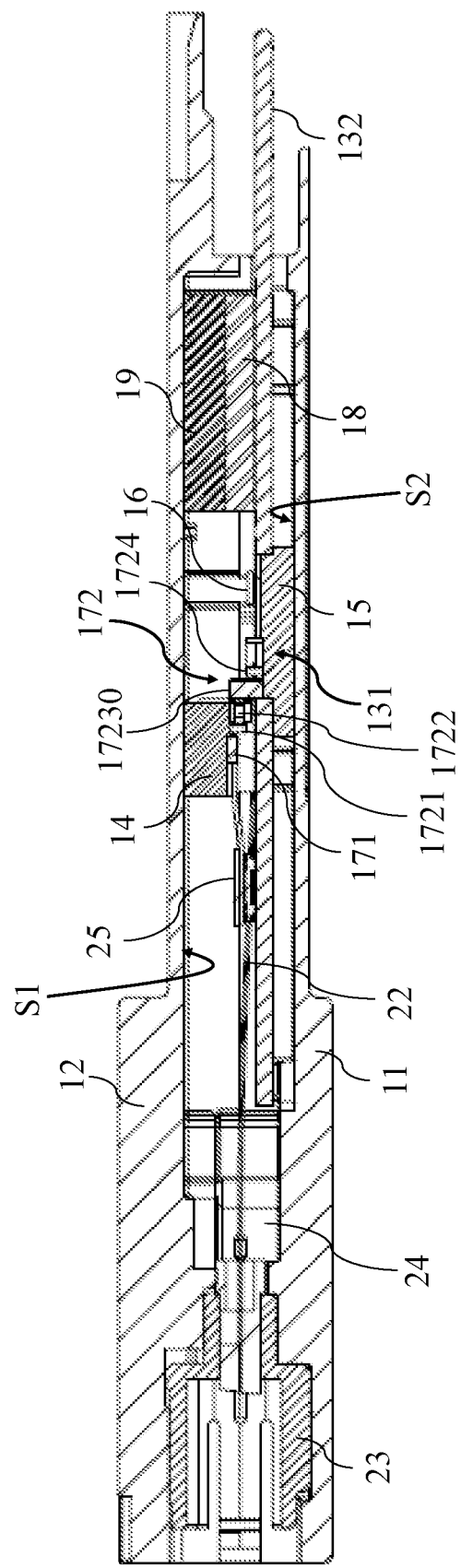
FIG. 4 is a sectional view of the optical module of FIG. 1 taken along the line AA.
Figure 5:
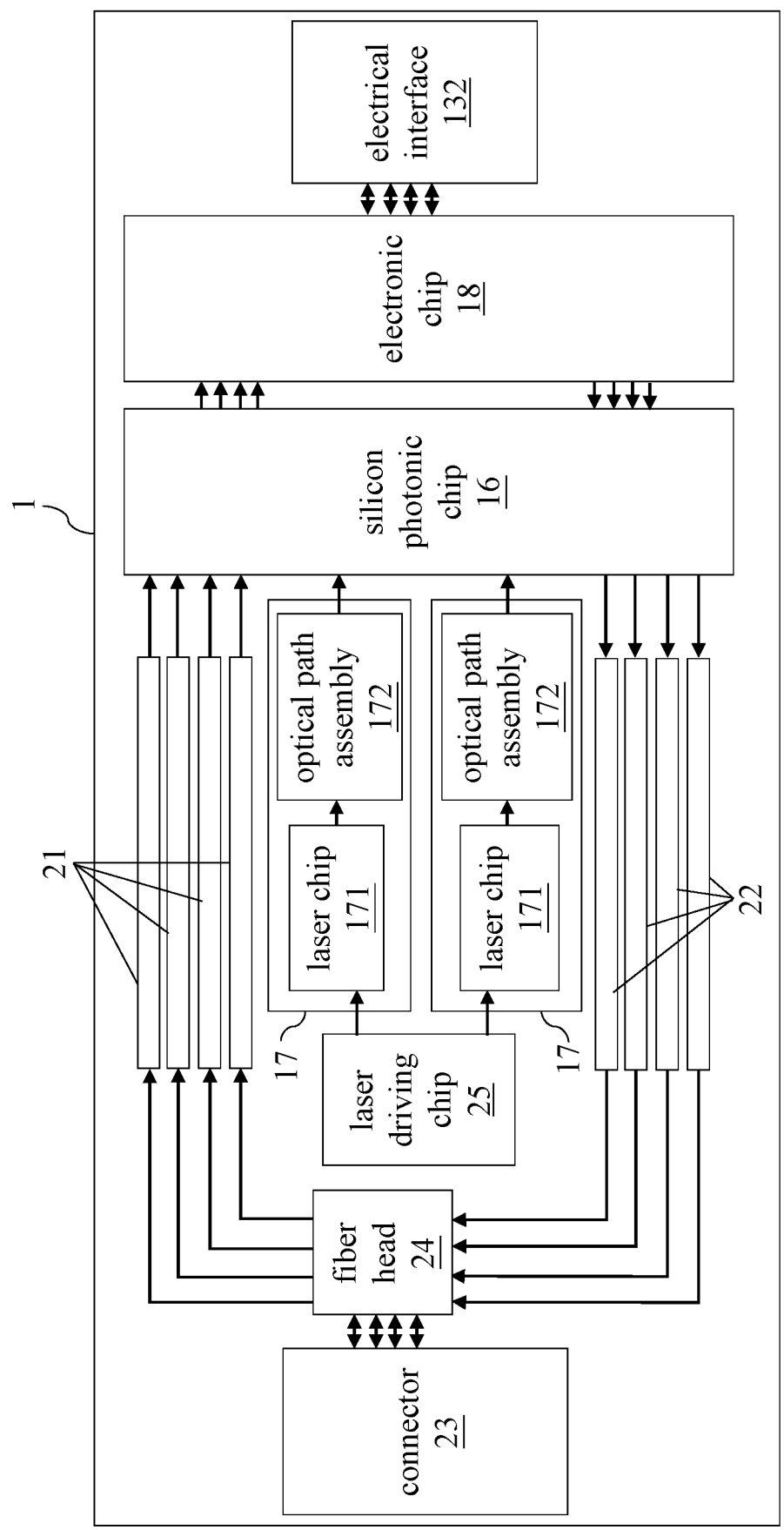
FIG. 5 is a block diagram of a circuit structure of an embodiment of the optical module of FIG. 1.

Please refer to FIG. 1 to FIG. 5, wherein FIG. 1 is a combination diagram of an optical module according to a first embodiment of the present disclosure, FIG. 2 is an exploded view of an embodiment of the optical module of FIG. 1, FIG. 3 is a partial perspective view of the optical module of FIG. 2, FIG. 4 is a sectional view of the optical module of FIG. 1 taken along the line AA, and FIG. 5 is a block diagram of a circuit structure of an embodiment of the optical module of FIG. 1. As shown in FIG. 1 to FIG. 5, the optical module 1 comprises a lower housing 11, an upper housing 12, a circuit board 13, a first metal base 14, a second metal base 15, a silicon photonic chip 16, a light emission module 17, an electronic chip 18, a heat-dissipating metal block 19, receiving-end fibers 21, transmitting-end fibers 22, a connector 23, a fiber head 24 and a laser driving chip 25, wherein the light emission module 17 comprises a laser chip 171 and an optical path assembly 172.

In this embodiment, the lower housing 11 and the upper housing 12 can be made of metal material, which is beneficial to realize electromagnetic shielding and heat dissipation. There are two light emission modules 17, four receiving-end fibers 21, and four transmitting-end fibers 22, and one laser driving chip 25 can drive the laser chips 171 included in each of the two light emission modules 17 at the same time. However, this embodiment is not intended to limit the present disclosure. The number of the receiving-end fibers 21 and the transmitting-end fibers 22 can be adjusted according to actual needs, and the laser driving chip 25 can also drive the laser chip 171 included in the light emission module 17 in a one-to-one manner.

In this embodiment, the upper housing 12 covers the lower housing 11; the first metal base 14 is disposed on the side S1 of the upper housing 12 facing the lower housing 11; and the second metal base 15 is disposed on the side S2 of the lower housing 11 facing the upper housing 12. The circuit board 13 is disposed on the second metal base 15, and the circuit board 13 is provided with a hollow region 131, so that part of the second metal base 15 exposed from the hollow region 131. In addition, one end of the circuit board 13 protruding from the inside of the optical module 1 is an electrical interface 132, such as a gold finger, which is electrically connected to a host computer (not drawn) such as an optical network unit and an optical line terminal, and is configured to transmit the electrical signal. The two light emission modules 17 are dispersedly disposed on the first metal base 14 and the second metal base 15 exposed from the hollow region 131. The laser chip 171 included in each of the two light emission modules 17 is electrically connected to the laser driving chip 25 disposed on the circuit board 13, and the laser driving chip 25 provide driving current to the laser chip 171 included in each of the two light emission modules 17, so that the laser chips 171 included in the two light emission modules 17 respectively emit the third optical signal and the optical path assembly 172 guides the third optical signals to the silicon photonic chip 16. The third optical signals provided by the two light emission modules 17 can be optical signals of the same wavelength or different wavelengths, and the type of the silicon photonic chip 16 can be selected according to whether the third optical signals provided by the two light emission modules 17 respectively are optical signals of the same wavelength. For example, when the third optical signals provided by the two light emission modules 17 are optical signals of different wavelengths, the silicon photonic chip with a demultiplexer and/or a multiplexer can be selected to facilitate the processing and transmission of subsequent optical signals. The type of the actual silicon photonic chip 16 can be selected according to actual needs.

In this embodiment, the silicon photonic chip 16 is disposed on the second metal base 15 exposed from the hollow region 131 and is electrically connected to the circuit board 13. The silicon photonic chip 16 is configured to modulate the third optical signal output from the light emission module 17 based on the electrical signal from the electronic chip 18, and then transmit the modulated third optical signal (i.e., the first optical signal) to the information processing equipment such as routers, switches, and electronic computers (not drawn) through the four transmitting-end fibers 22, the fiber head 24 and the connector 23 in sequence; and receive the second optical signal from the information processing device through the connector 23, the fiber head 24 and the four receiving-end fibers 21 in sequence, and then convert the second optical signal into an electrical signal and transmit the electrical signal to the electronic chip 18. The electronic chip 18 is disposed on the circuit board 13, and is configured to transmit the electrical signal from the silicon photonic chip 16 to the host computer, and transmit the electrical signal from the host computer to the silicon photonic chip 16. In addition, in order to reduce the loss of electrical signal transmission between the silicon photonic chip 16 and the electronic chip 18, the silicon photonic chip 16 disposed on the second metal base 15 and the electronic chip 18 disposed on the circuit board 13 are located in the same plane. The heat-dissipating metal block 19 is disposed on the electronic chip 18 and is in contact with the upper housing 12 to transfer the heat energy generated by the electronic chip 18 to the upper housing 12 for heat dissipation.

It should be noted that, in order to reduce the wire length between the silicon photonic chip 16 and the circuit board 13, the installation height of the silicon photonic chip 16 can be adjusted through the second metal base 15, so that the silicon photonic chip 16 and the circuit board 13 can be located at the same height as possible. In addition, there are two light emission modules 17 in FIG. 1 to FIG. 4, and the first metal base 14 in FIG. 1 to FIG. 4 is a U-shaped housing with the opening at one end for the laser driving chip 25 providing the driving current to the laser chip 171 of the light emission modules 17, and the opening at the other end for transmitting the third optical signal emitted by the laser chip 171 to the silicon photonic chip 16, and covers part of the light emission module 17, so that it is difficult to describe the positions of the laser chips 171 and the optical path assemblies 172 included in the two light emission modules 17 and the optical path of the third optical signals through the drawings in FIG. 1 to FIG. 4. In the following description of FIG. 5 to FIG. 8, the positions of the laser chip 171 and the optical path assembly 172 included in the single light emission module 17 and the optical path of the third optical signal are used as examples for description. Those skilled in the art can derive and apply this to the embodiment in which the light module 1 comprises a plurality of light emission modules 17.

Figure 6:
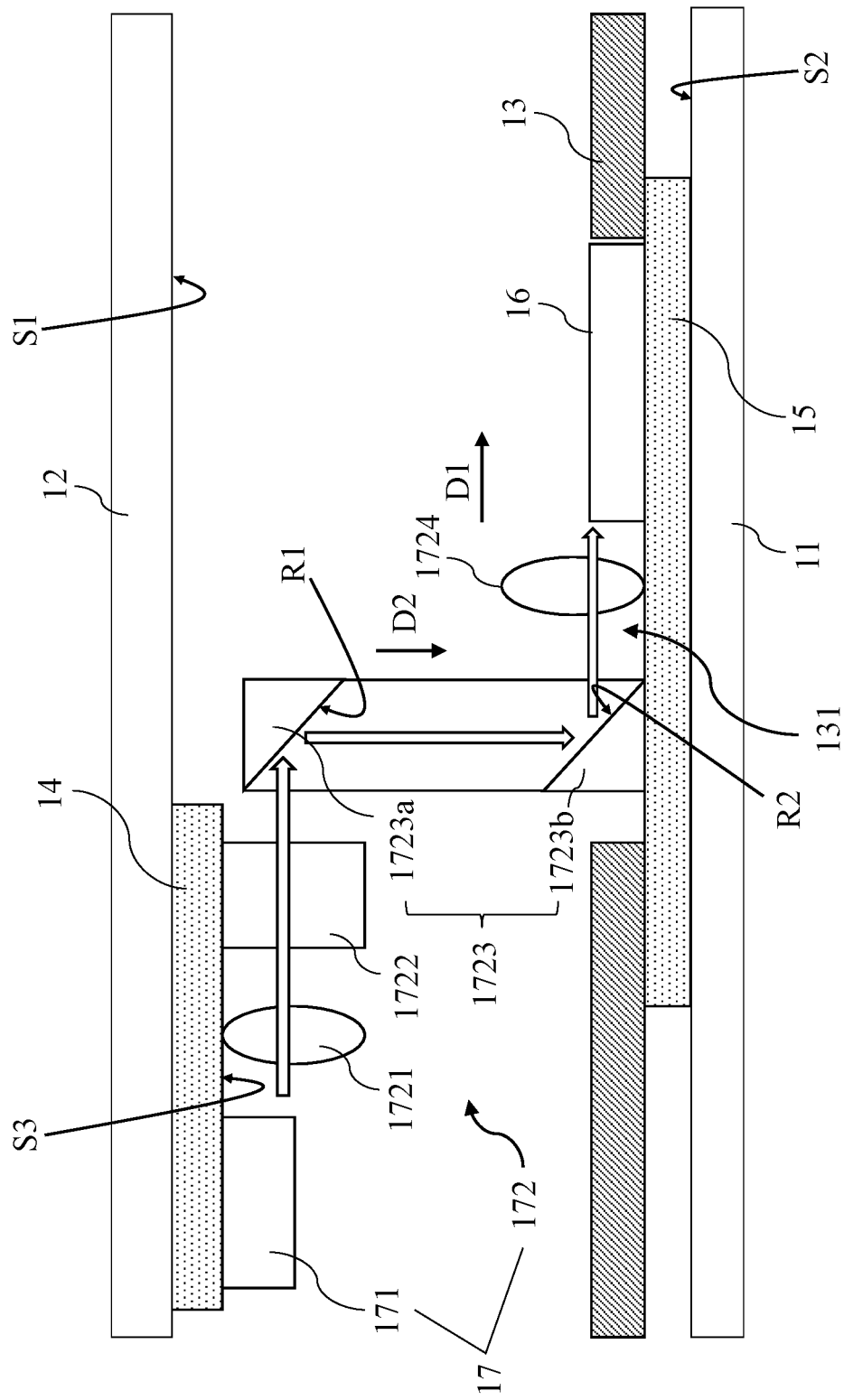
FIG. 6 is a schematic diagram of an optical signal transmission structure of a first embodiment in which the light emission module of the present disclosure provides the third optical signal to the silicon photonic chip.

Please refer to FIG. 6, which is a schematic diagram of an optical signal transmission structure of a first embodiment in which the light emission module of the present disclosure provides the third optical signal to the silicon photonic chip. As shown in FIG. 6, the laser chip 171 is disposed on the first metal base 14 for emitting a third optical signal as shown by the thick arrow on the figure; and the components of the optical path assembly 172 are distributed on the first metal base 14 and the second metal base 15 exposed from the hollow region 131, and the optical path assembly 172 is configured to guide the third optical signal emitted by the laser chip 171 to the silicon photonic chip 16. The optical path assembly 172 may sequentially comprise a first lens 1721, an optical isolator 1722, a mirror assembly 1723 and a second lens 1724 along the optical path of the third optical signal, wherein the laser chip 171, the first lens 1721 and the optical isolator 1722 are disposed on the first side S3 of the first metal base 14 facing the circuit board 13, and the mirror assembly 1723 and the second lens 1724 are disposed on the second metal base 15 exposed from the hollow region 131. The first lens 1721 is configured to converge the third optical signal emitted by the laser chip 171 into the optical isolator 1722; the optical isolator 1722 is configured to prevent the return of the third optical signal passing therethrough; the mirror assembly 1723 is configured to reflect the third optical signal from the optical isolator 1722 twice and then incident on the second lens 1724, wherein each reflection is to turn the optical path of the third optical signal by 90 degrees; and the second lens 1724 is configured to converge the third optical signal into the silicon photonic chip 16.

Specifically, in the embodiment of FIG. 6, the mirror assembly 1723 comprises a first reflection unit 1723a and a second reflection unit 1723b, and a reflection surface R1 of the first reflection unit 1723a and a reflection surface R2 of the second reflection unit 1723b are parallel to each other. Therefore, when the third optical signal emitted by the laser chip 171 along a first direction D1 passes through the first lens 1721 and the optical isolator 1722 and is incident on the first reflection unit 1723a, the reflection surface R1 of the first reflection unit 1723a reflects the incident third optical signal to the second reflection unit 1723b along a second direction D2 perpendicular to the first direction D1, and the reflection surface R2 of the second reflection unit 1723b reflects the incident third optical signal to the second lens 1724 along the first direction D1, and the second lens 1724 converges the third optical signal into the silicon photonic chip 16. The first reflection unit 1723a and the second reflection unit 1723b may be right-angle isosceles reflecting prisms, the first direction D1 may be the rightward horizontal direction of the drawing of FIG. 6, and the second direction D2 may be the downward vertical direction of the drawing of FIG. 6.

It should be noted that, when there is a plurality of the light emission modules 17, the mirror assemblies 1723 included in the plurality of the light emission modules 17 are integrated into a reflection structure 17230 as shown in FIG. 3, which is beneficial to reduce the space required for disposing a plurality of light emission modules 17. In addition, when there is a plurality of the light emission modules 17, the third optical signals provided by the plurality of the light emission modules 17 to the silicon photonic chip 16 may be optical signals of the same wavelength or different wavelengths.

Figure 7:
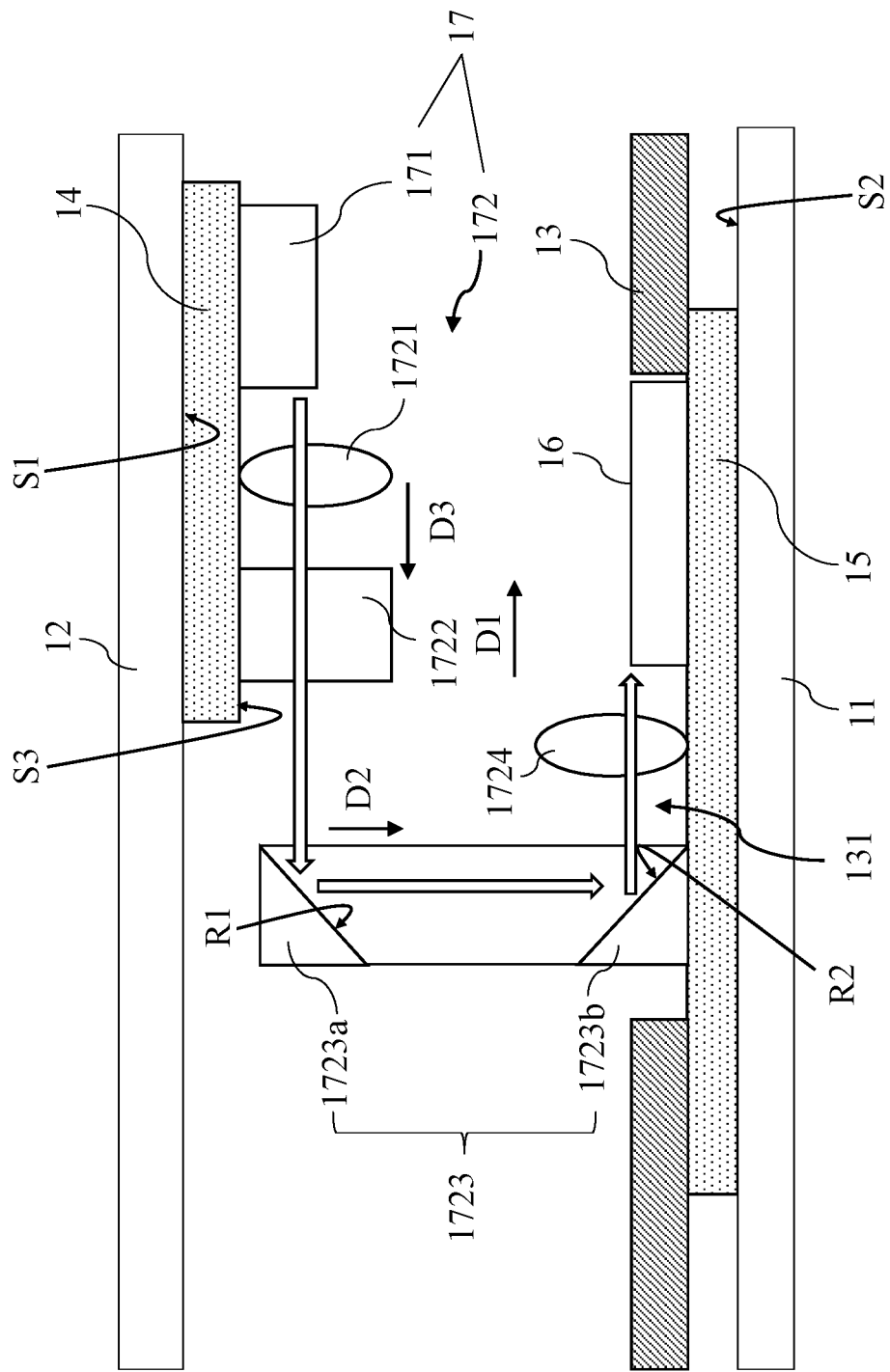
FIG. 7 is a schematic diagram of an optical signal transmission structure of a second embodiment in which the light emission module of the present disclosure provides the third optical signal to the silicon photonic chip.

Please refer to FIG. 7, which is a schematic diagram of an optical signal transmission structure of a second embodiment in which the light emission module of the present disclosure provides the third optical signal to the silicon photonic chip. The difference between the embodiment of FIG. 7 and the embodiment of FIG. 6 is that the reflection surface R1 of the first reflection unit 1723a and the reflection surface R2 of the second reflection unit 1723b are modified to be perpendicular to each other. Therefore, when the third optical signal emitted by the laser chip 171 along the first direction D1 passes through the first lens 1721 and the optical isolator 1722 and is incident on the first reflection unit 1723a, the reflection surface R1 of the first reflection unit 1723a reflects the incident third optical signal to the second reflection unit 1723b along the second direction D2 perpendicular to the first direction D1, and the reflection surface R2 of the second reflection unit 1723b reflects the incident third optical signal to the second lens 1724 along a third direction D3 opposite to the first direction D1, and the second lens 1724 converges the third optical signal into the silicon photonic chip 16. The third direction D3 may be the leftward horizontal direction of the drawing of FIG. 7, the second direction D2 may be the downward vertical direction of the drawing of FIG. 7, and the first direction D1 may be the rightward horizontal direction of the drawing of FIG. 7.

It should be noted that the relative position between the first metal base 14 and the second metal base 15 needs to be adjusted based on the optical path design of FIG. 7. If the projections of the first metal base 14 and the second metal base 15 on the horizontal direction in FIG. 7 overlap, the shape of the first metal base 14 can be adjusted to be a metal plate instead of the aforementioned U-shaped housing with openings at both ends in FIG. 1 to FIG. 4. The actual shape of the first metal base 14 can be adjusted according to actual needs. In addition, the optical path design of FIG. 7 can make the projections of the first metal base 14 and the second metal base 15 on the horizontal direction of FIG. 7 overlap, which saves configuration space and is beneficial to apply in a miniaturized optical module 1.

Figure 8:
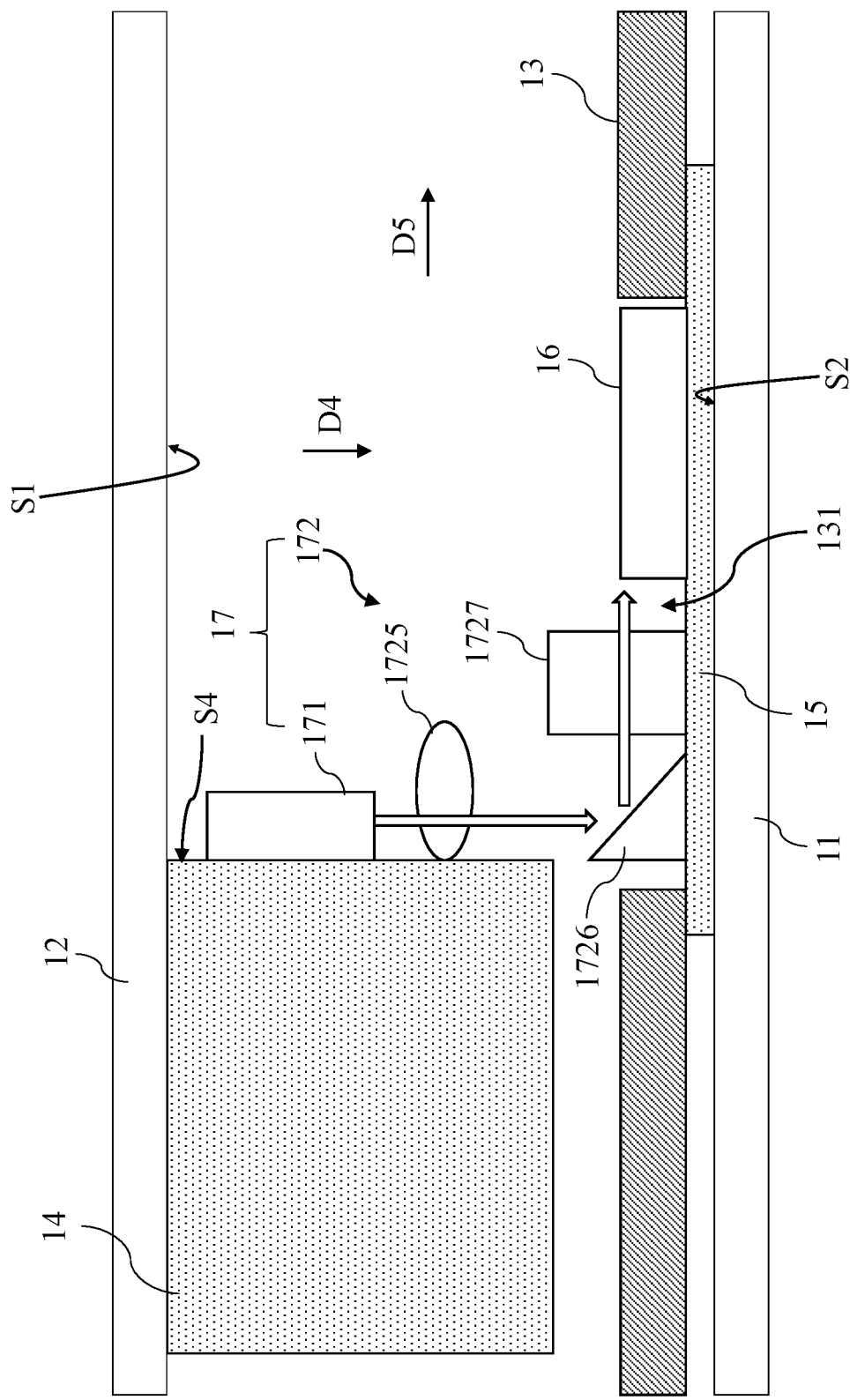
FIG. 8 is a schematic diagram of an optical signal transmission structure of a third embodiment in which the light emission module of the present disclosure provides the third optical signal to the silicon photonic chip.

Please refer to FIG. 8, which is a schematic diagram of an optical signal transmission structure of a third embodiment in which the light emission module of the present disclosure provides the third optical signal to the silicon photonic chip. As shown in FIG. 8, the laser chip 171 is disposed on the first metal base 14 for emitting a third optical signal as shown by the thick arrow on the figure; and the components of the optical path assembly 172 are distributed on the first metal base 14 and the second metal base 15 exposed from the hollow region 131, and the optical path assembly 172 is configured to guide the third optical signal emitted by the laser chip 171 to the silicon photonic chip 16. The optical path assembly 172 may sequentially comprise a lens 1725, a mirror 1726 and an optical isolator 1727 along the optical path of the third optical signal, wherein the laser chip 171 and the lens 1725 are disposed on the second side S4 of the first metal base 14 which is perpendicular to the upper housing 12, and the mirror 1726 and the optical isolator 1727 are disposed on the second metal base 15 exposed from the hollow area 131. The lens 1725 is configured to converge the third optical signal emitted by the laser chip 171 to the mirror 1726 along the fourth direction D4; the mirror 1726 is configured to reflect the incident third optical signal to the optical isolator 1727 along the fifth direction D5 perpendicular to the fourth direction D4; and the optical isolator 1727 is configured to prevent the return of the third optical signal passing therethrough, so that the third optical signal passing through the optical isolator 1727 is incident on the silicon photonic chip 16. The reflection of the mirror 1726 is to turn the optical path of the third optical signal by 90 degrees, the mirror 1726 can be but is not limited to a right-angle isosceles reflective prism, the fourth direction D4 may be a downward vertical direction of the drawing of FIG. 8, and the fifth direction D5 may be a rightward horizontal direction of the drawing of FIG. 8.

It should be noted that, based on the optical path design of FIG. 8 and the condition that the laser chip 171 and the lens 1725 are disposed on the second side S4 of the first metal base 14 perpendicular to the upper housing 12, the thickness of the first metal base 14 in FIG. 8 in the vertical direction is thicker than that of the first metal base 14 in each of FIG. 6 and FIG. 7 in the vertical direction, so the shape of the first metal base 14 of FIG. 8 can be adjusted to be a metal plate instead of the aforementioned U-shaped housing with openings at both ends in FIG. 1 to FIG. 4. The actual shape of the first metal base 14 can be adjusted according to actual needs. In addition, the optical path in FIG. 8 is shorter than that in each of FIG. 6 and FIG. 7, so that the number of components of the optical path assembly 172 of FIG. 8 is less than that of the optical path assembly 172 in each of FIG. 6 and FIG. 7, which can reduce the cost of the optical path assembly 172, save configuration space and be beneficial to apply in a miniaturized optical module 1.

As can be seen from FIG. 6 to FIG. 8, in the present disclosure, by constructing optical paths on different planes, the heat energy generated by the laser chip 171 can be dissipated through the first metal base 14 from the upper housing 12 which belongs to the optimal heat dissipation path. That is to say, in order to solve the problem of poor heat dissipation in the prior art, the present disclosure proposes to use the mirror assembly 1723 or the mirror 1726 to deflect the optical path (i.e., constructing optical paths on different planes), so that the heat energy of the light emission module 17 and the silicon photonic chip 16 can be dissipated through the upper housing 12 and the lower housing 11. It should be noted that the deflected optical path designed for the heat dissipation requirement in the present disclosure is different from the reflection path designed for the demultiplexing requirement in the prior art.

In the present disclosure, the third optical signal emitted by the laser chip 171 can also be guided to the silicon photonic chip 16 in a straight line through the optical path assembly 172, wherein the optical path assembly 172 comprises at least one lens and an optical isolator; the at least one lens and the optical isolator are disposed on the first side S3 of the first metal base 14 facing the circuit board 13 and/or on the second metal base 15 exposed from the hollow region 131; the at least one lens is configured to converge the incident third optical signal; and the optical isolator is configured to prevent the return of the third optical signal passing therethrough.

Figure 9:
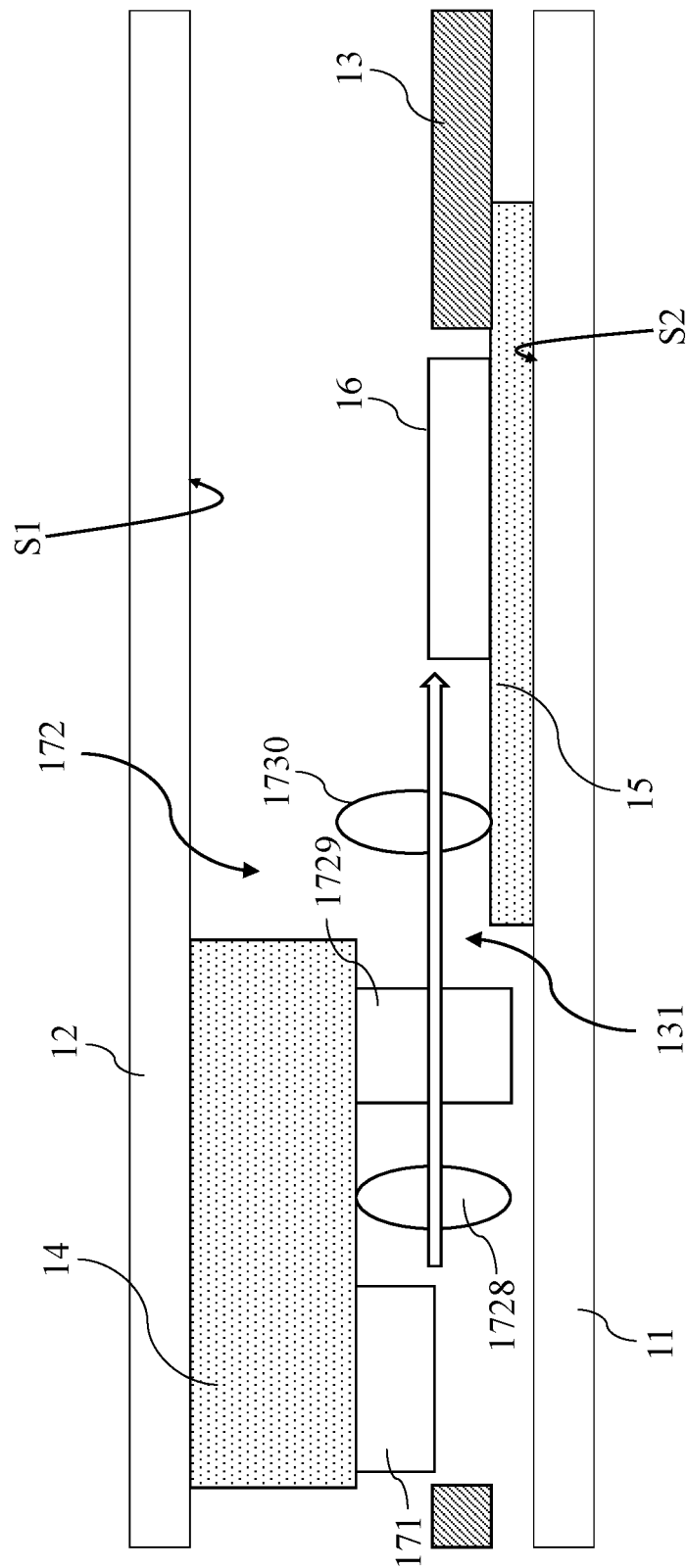
FIG. 9 is a schematic diagram of an optical signal transmission structure of a fourth embodiment in which the light emission module of the present disclosure provides the third optical signal to the silicon photonic chip.

Specifically, please refer to FIG. 9, which is a schematic diagram of an optical signal transmission structure of a fourth embodiment in which the light emission module of the present disclosure provides the third optical signal to the silicon photonic chip. As shown in FIG. 9, the laser chip 171 is disposed on the first metal base 14 for emitting a third optical signal as shown by the thick arrow on the figure; and the components of the optical path assembly 172 are distributed on the first metal base 14 and the second metal base 15 exposed from the hollow region 131, and the optical path assembly 172 is configured to guide the third optical signal emitted by the laser chip 171 to the silicon photonic chip 16. The optical path assembly 172 may sequentially comprise a first lens 1728, an optical isolator 1729 and a second lens 1730 along the optical path of the third optical signal, wherein the first lens 1728 and the optical isolator 1729 are disposed on the first metal base 14 facing the first side S3 of the circuit board 13, the second lens 1730 is disposed on the second metal base 15 exposed from the hollow region 131; the first lens 1728 is configured to converge the third optical signal emitted by the laser chip 171 to the optical isolator 1729; the optical isolator 1729 is configured to prevent the return of the third optical signal passing therethrough; and the second lens 1730 is configured to converge the third optical signal from optical isolator 1729 to the silicon photonic chip 16.

Figure 10:
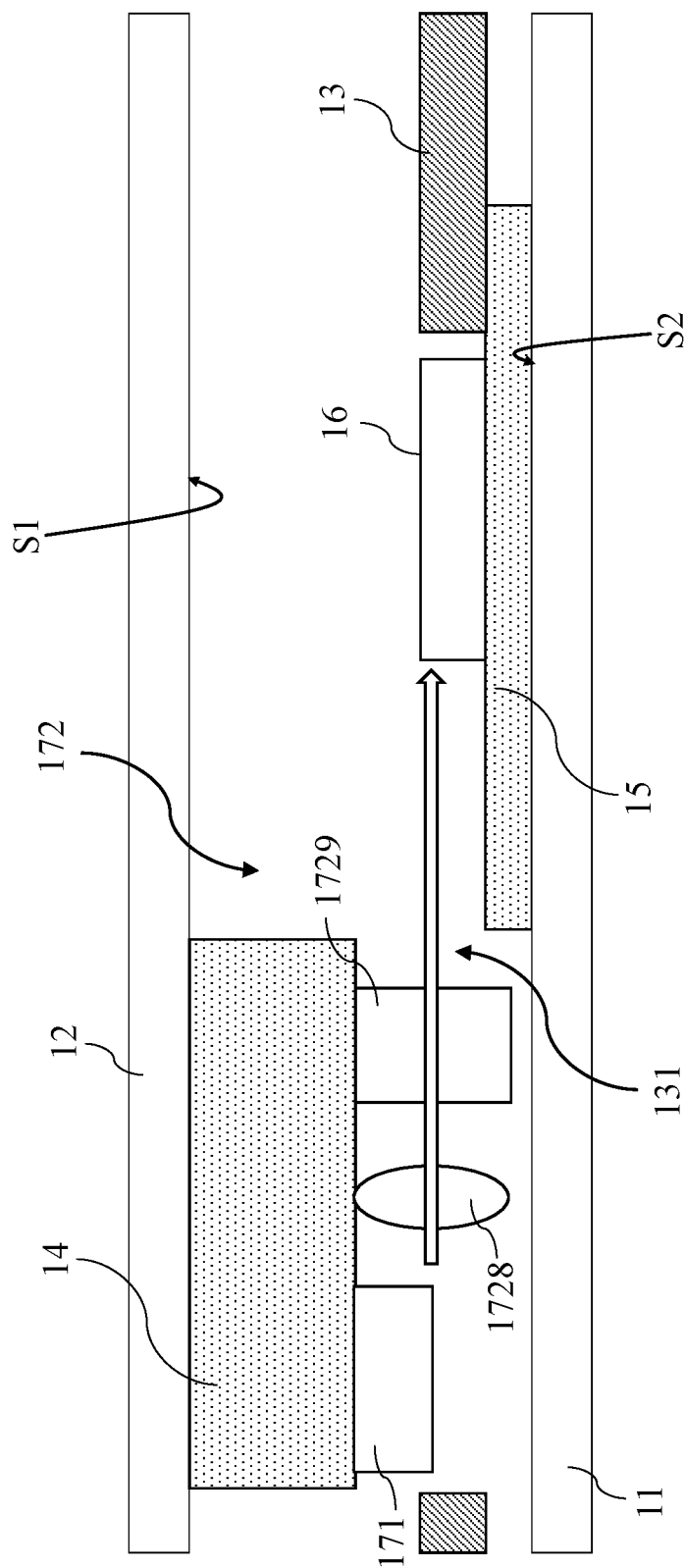
FIG. 10 is a schematic diagram of an optical signal transmission structure of a fifth embodiment in which the light emission module of the present disclosure provides the third optical signal to the silicon photonic chip.

Please refer to FIG. 10, which is a schematic diagram of an optical signal transmission structure of a fifth embodiment in which the light emission module of the present disclosure provides the third optical signal to the silicon photonic chip. The difference between the embodiment of FIG. 10 and the embodiment of FIG. 9 is that the optical path assembly 172 of FIG. 10 does not comprise the second lens 1730. Since the optical path of FIG. 10 is shorter than that of FIG. 9, the optical path assembly 172 of FIG. 10 may not comprise the second lens 1730 to reduce the cost of the optical path assembly 172 and save the configuration space, which is beneficial to apply in a miniaturized optical module 1.

Figure 11:
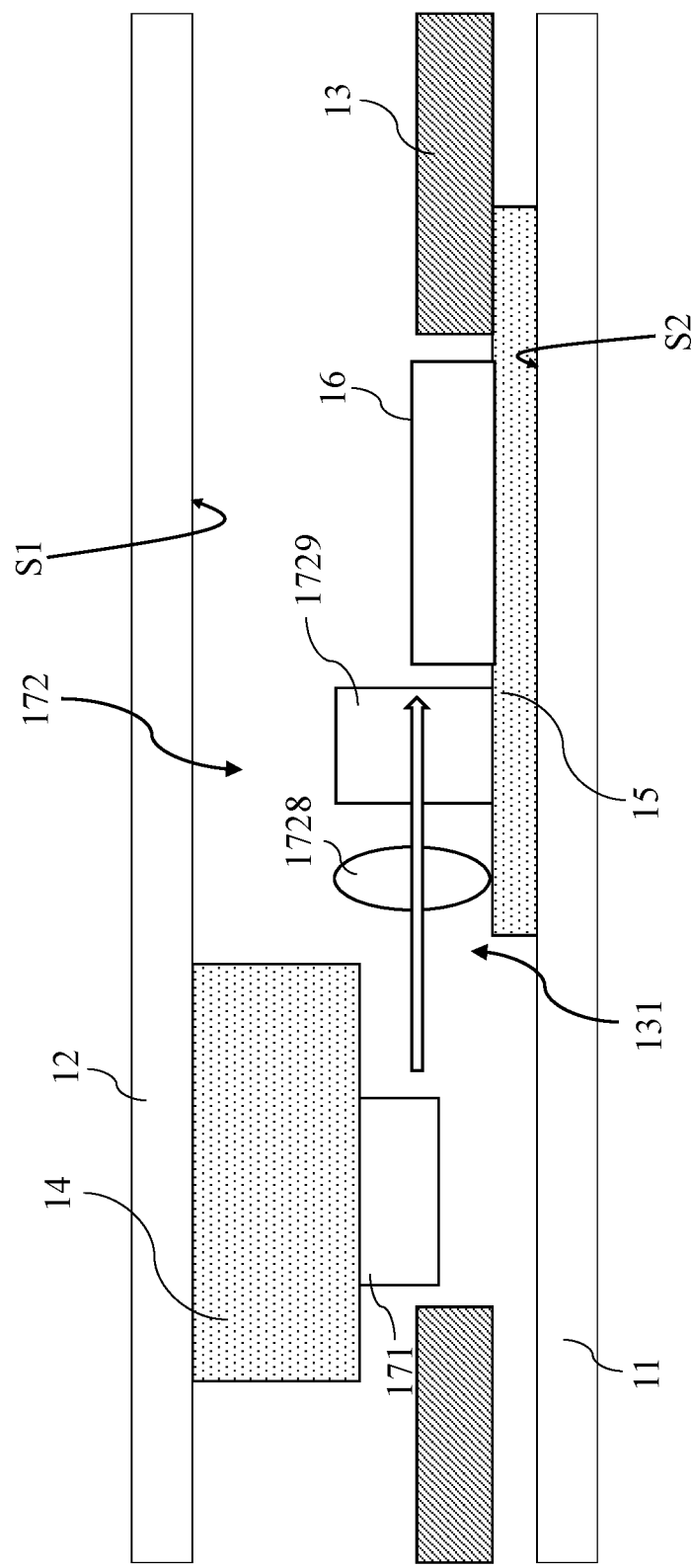
FIG. 11 is a schematic diagram of an optical signal transmission structure of a sixth embodiment in which the light emission module of the present disclosure provides the third optical signal to the silicon photonic chip.

Please refer to FIG. 11, which is a schematic diagram of an optical signal transmission structure of a sixth embodiment in which the light emission module of the present disclosure provides the third optical signal to the silicon photonic chip. The difference between the embodiment of FIG. 11 and the embodiment of FIG. 10 is that the first lens 1728 and the optical isolator 1729 are modified to be disposed on the second metal base 15 exposed from the hollow region 131.

It should be noted that, in FIG. 9 to FIG. 11, since the optical path of the third optical signal from the laser chip 171 to the silicon photonic chip 16 is in a straight line, and the heat energy of the light emission module 17 and the silicon photonic chip 16 can be dissipated through the upper housing 12 and the lower housing 11, the shape of the first metal base 14 in each of FIG. 9 to FIG. 11 can be adjusted to be a metal block instead of the aforementioned U-shaped housing with openings at both ends in FIG. 1 to FIG. 4. The actual shape of the first metal base 14 can be adjusted according to actual needs. In addition, the optical path in each of FIG. 9 to FIG. 11 is in a straight line, so the optical path assembly 172 may not comprise a reflective element, thereby reducing the cost of the optical path assembly 172 and reducing light loss.

Figure 12:
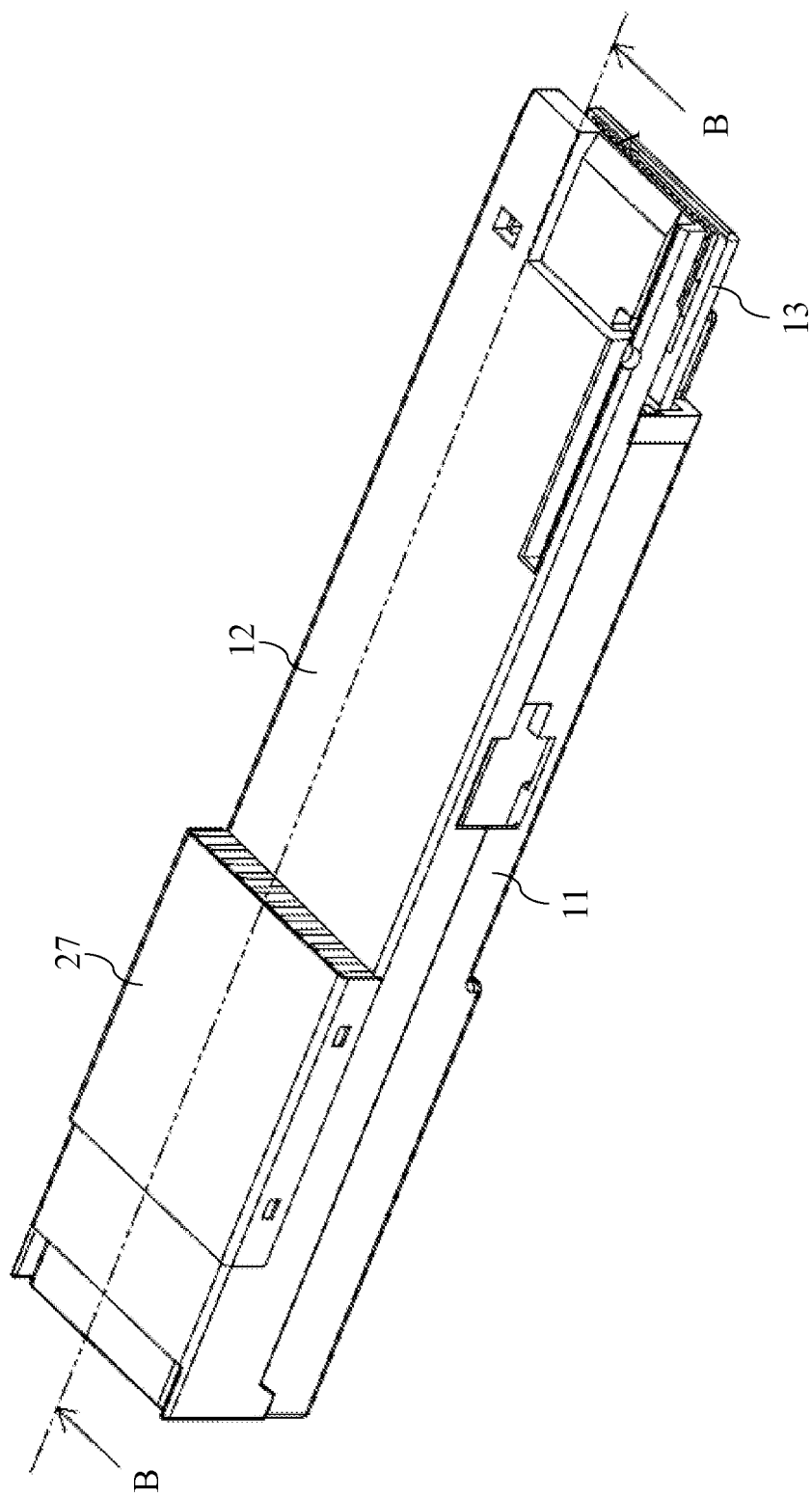
FIG. 12 is a combined view of an optical module according to a second embodiment of the present disclosure.
Figure 13:
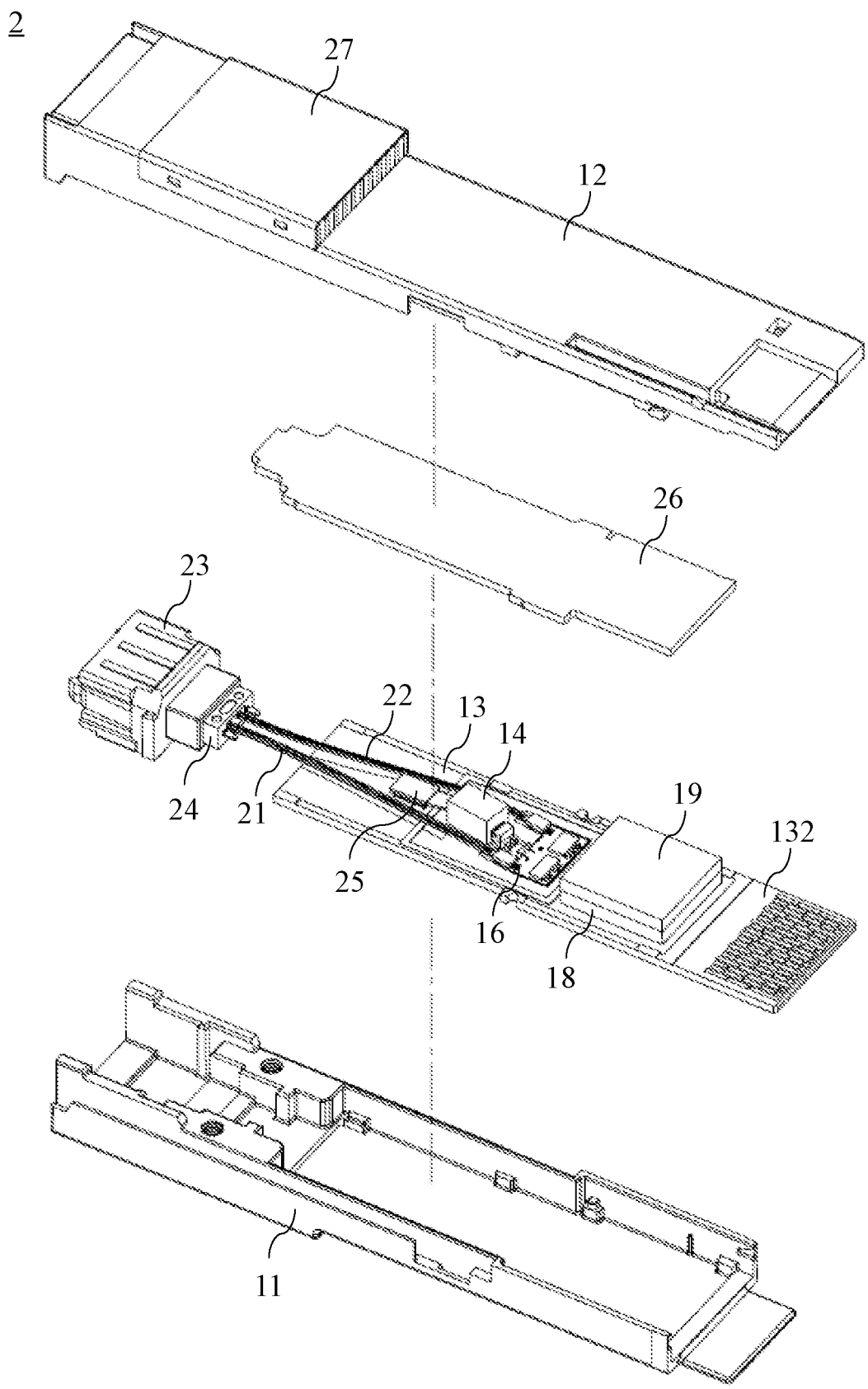
FIG. 13 is an exploded view of an embodiment of the optical module of FIG. 12.
Figure 14:
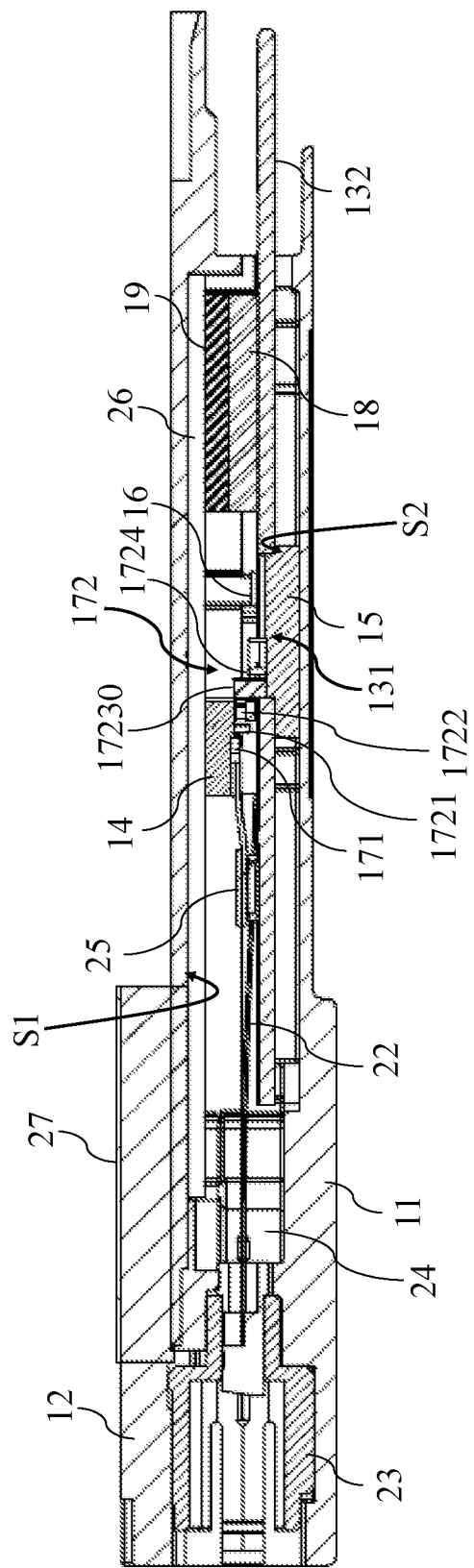
FIG. 14 is a sectional view of the optical module of FIG. 12 taken along line BB.

Please refer to FIG. 12 to FIG. 14, wherein FIG. 12 is a combined view of an optical module according to a second embodiment of the present disclosure, FIG. 13 is an exploded view of an embodiment of the optical module of FIG. 12, and FIG. 14 FIG. 14 is a sectional view of the optical module of FIG. 12 taken along line BB. The difference between the optical module 2 in each of FIG. 12 to FIG. 14 and the optical module 1 in each of FIG. 1 to FIG. 5 is that the optical module 2 may further comprise a heat conduction tube 26 disposed between the upper housing 12 and the first metal base 14 and in contact with the upper housing 12 and the first metal base 14, so that the optical module 2 not only has the lateral heat dissipation capability, but also has the vertical heat dissipation capability. That is, the heat energy is dissipated into the environment in the vertical direction and the horizontal direction of the drawing of FIG. 14.

In one embodiment, the optical module 2 may further comprise a heat dissipation fin 27, which is disposed on a side of the upper housing 12 away from the lower housing 11 and in contact with the heat conduction tube 26, so that the heat energy laterally conducted by the heat conduction tube 26 can be further dissipated from the heat dissipation fin 27 to the environment.

To sum up, in the embodiments of the present disclosure, by the design of the optical path for transmitting the third optical signal emitted by the laser chip to the silicon photonic chip, the laser chip can be disposed on the first metal base, the optical path assembly can be disposed on the first metal base and/or the second metal base exposed from the hollow region, and the silicon photonic chip can be disposed on the second metal base exposed from the hollow region, so that the heat energy of the laser chip and part of the optical path assembly can be dissipated through the first metal base from the upper housing that belongs to the optimal heat dissipation path, and the heat energy of another part of the optical path assembly and the silicon photonic chip can be dissipated from the lower housing through the second metal base, which solves the problem of poor heat dissipation in the prior art. In addition, only part of the optical path assembly and the silicon photonic chip are disposed on the second metal base exposed from the hollow region, so that the circuit board can reduce the area of the hollow region and maintain the structural strength. Moreover, the optical path of the third optical signal from the light emission module to the silicon photonic chip can be in a straight line or can be constructed on different planes, so that the opto-mechanical layout in the optical module can be more flexible. Furthermore, the optical module can increase the lateral heat dissipation capability through the arrangement of the heat conduction tube, and at the same time, the optical module can further comprise the heat dissipation fin disposed on the upper housing to improve the heat dissipation efficiency.

Although the above-described components are included in the drawings of the present disclosure, it is not excluded that more other additional components can be used to achieve better technical effects without violating the spirit of the invention.

Although the present disclosure is disclosed in the foregoing embodiments, it should be noted that these descriptions are not intended to limit the present disclosure. On the contrary, the present disclosure covers modifications and similar arrangements obvious to those skilled in the art. Therefore, the scope of the claims is to be construed in the broadest manner so as to encompass all obvious modifications and similar arrangements.

What is claimed is:

1. An optical module, comprising:
   a lower housing;
   an upper housing covering the lower housing;
   a first metal base disposed on a side of the upper housing facing the lower housing;
   a second metal base disposed on a side of the lower housing facing the upper housing;
   a circuit board disposed on the second metal base and provided with a hollow region to make part of the second metal base exposed from the hollow region;
   a silicon photonic chip disposed on the second metal base exposed from the hollow region, electrically connected to the circuit board, and configured to output a first optical signal or receive a second optical signal; and
   a light emission module comprising:
     a laser chip disposed on the first metal base and configured to emit a third optical signal; and
     an optical path assembly disposed on the first metal base and/or on the second metal base exposed from the hollow region, and configured to guide the third optical signal emitted by the laser chip to the silicon photonic chip.

2. The optical module according to claim 1, wherein the optical path assembly sequentially comprises a first lens, an optical isolator, a mirror assembly and a second lens along an optical path of the third optical signal; the laser chip, the first lens and the optical isolator are disposed on a first side of the first metal base facing the circuit board; the mirror assembly and the second lens are disposed on the second metal base exposed from hollow region; the first lens is configured to converge the third optical signal emitted by the laser chip into the optical isolator; the optical isolator is configured to prevent return of the third optical signal passing therethrough; the mirror assembly is configured to reflect the third optical signal from the optical isolator twice and then incident on the second lens; the second lens is configured to converge the third optical signal into the silicon photonic chip.

3. The optical module according to claim 2, when there is a plurality of the light emission modules, the mirror assemblies included in the plurality of the light emission modules are integrated into a reflection structure.

4. The optical module according to claim 2, wherein the mirror assembly comprises a first reflection unit and a second reflection unit; a reflection surface of the first reflection unit and a reflection surface of the second reflection unit are parallel to each other; when the third optical signal emitted by the laser chip along a first direction passes through the first lens and the optical isolator and is incident on the first reflection unit, the reflection surface of the first reflection unit reflects the incident third optical signal to the second reflection unit along a second direction perpendicular to the first direction, and the reflection surface of the second reflection unit reflects the incident third optical signal to the second lens along the first direction.

5. The optical module according to claim 2, wherein the mirror assembly comprises a first reflection unit and a second reflection unit; a reflection surface of the first reflection unit and a reflection surface of the second reflection unit are perpendicular to each other; when the third optical signal emitted by the laser chip along a first direction passes through the first lens and the optical isolator and is incident on the first reflection unit, the reflection surface of the first reflection unit reflects the incident third optical signal to the second reflection unit along a second direction perpendicular to the first direction, and the reflection surface of the second reflection unit reflects the incident third optical signal to the second lens along a third direction opposite to the first direction.

6. The optical module according to claim 1, wherein the optical path assembly sequentially comprises a lens, a mirror and an optical isolator along an optical path of the third optical signal; the laser chip and the lens are disposed on a second side of the first metal base perpendicular to the upper housing, and the mirror and the optical isolator are disposed on the second metal base exposed from the hollow region; the lens is configured to converge the third optical signal emitted by the laser chip to the mirror; the mirror is configured to reflect the incident third light signal to the optical isolator; the optical isolator is configured to prevent return of the third optical signal passing therethrough.

7. The optical module according to claim 1, wherein the optical path assembly guides the third optical signal emitted by the laser chip to the silicon photonic chip in a straight line; the optical path assembly comprises at least one lens and an optical isolator; the at least one lens and the optical isolator are disposed on a first side of the first metal base facing the circuit board and/or on the second metal base exposed from the hollow region; the at least one lens is configured to converge the incident third optical signal; the optical isolator is configured to prevent return of the third optical signal passing therethrough.

8. The optical module according to claim 1, further comprising a heat conduction tube disposed between the upper housing and the first metal base and in contact with the upper housing and the first metal base.

9. The optical module according to claim 8, further comprising a heat dissipating fin disposed on a side of the upper housing away from the lower housing and in contact with the heat conduction tube.

10. The optical module according to claim 1, further comprising a laser driving chip disposed on the circuit board, wherein when there is a plurality of the optical emission modules, the laser driving chip is connected to the laser chip included in each of the plurality of the light emission modules, and provides a driving current to the laser chip included in each of the plurality of the light emission modules, so that the laser chip included in each of the plurality of the light emission modules emits the third optical signal.

* * * * *